(12) United States Patent
Fantauzza

(10) Patent No.: US 9,058,728 B2
(45) Date of Patent: Jun. 16, 2015

(54) HAPTIC SYSTEMS, DEVICES, AND METHODS USING TRANSMISSION OF PRESSURE THROUGH A FLEXIBLE MEDIUM

(75) Inventor: Jill Marie Fantauzza, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 154 days.

(21) Appl. No.: 13/883,547

(22) PCT Filed: Nov. 7, 2011

(86) PCT No.: PCT/US2011/059661
§ 371 (c)(1),
(2), (4) Date: May 3, 2013

(87) PCT Pub. No.: WO2012/061840
PCT Pub. Date: May 10, 2012

(65) Prior Publication Data
US 2013/0229271 A1    Sep. 5, 2013

Related U.S. Application Data

(60) Provisional application No. 61/435,003, filed on Jan. 21, 2011, provisional application No. 61/410,383, filed on Nov. 5, 2010.

(51) Int. Cl.
*H04B 3/36* (2006.01)
*G08B 6/00* (2006.01)
*G06F 3/01* (2006.01)

(52) U.S. Cl.
CPC . *G08B 6/00* (2013.01); *G06F 3/016* (2013.01)

(58) Field of Classification Search
CPC ........ G08B 6/00; G06F 3/016; A47G 9/0207; A47G 9/1045; A47G 2009/006; A61H 23/0236; A61M 21/00
USPC ........ 340/407.1, 407.2, 7.6, 573.1, 575, 4.12; 345/156, 173; 600/28; 434/112, 113, 434/114
See application file for complete search history.

(56) References Cited

U.S. PATENT DOCUMENTS

| | | | |
|---|---|---|---|
| 4,969,867 A | 11/1990 | Cohen | |
| 2003/0067440 A1 | 4/2003 | Rank | |
| 2003/0227374 A1* | 12/2003 | Ling et al. | 340/407.1 |
| 2007/0178942 A1* | 8/2007 | Sadler et al. | 455/567 |
| 2009/0030332 A1 | 1/2009 | Schecter | |
| 2009/0250267 A1 | 10/2009 | Heubel | |
| 2010/0141408 A1 | 6/2010 | Doy | |
| 2010/0225340 A1 | 9/2010 | Smith | |
| 2010/0238132 A1 | 9/2010 | Schmidt | |
| 2010/0308982 A1* | 12/2010 | Cooperstock et al. | 340/407.1 |

OTHER PUBLICATIONS

International Search Report and Written Opinion completed Feb. 13, 2012 for priority application PCT/US2011/059661.

* cited by examiner

*Primary Examiner* — Anh V La
(74) *Attorney, Agent, or Firm* — Troutman Sanders LLP; Ryan A. Schneider; Alexis N. Simpson

(57) ABSTRACT

Systems, devices, and methods for producing haptic actuation are disclosed. An exemplary haptic system comprises a transducer and a transmission medium. The transducer induces pressure waves within the transmission medium, which is a sealed capsule with a flexible geometry. A surface of the sealed capsule thus produces haptic effects on a contact surface.

20 Claims, 5 Drawing Sheets

HAPTIC SYSTEMS, DEVICES, AND METHODS USING TRANSMISSION OF PRESSURE THROUGH A FLEXIBLE MEDIUM

CROSS-REFERENCE TO RELATED APPLICATIONS

This application is a US National Stage of International Application No. PCT/US2011/059661, filed 7 Nov. 2011, which claims the benefit of both U.S. Provisional Application No. 61/410,383 filed 5 Nov. 2010, and U.S. Provisional Application No. 61/435,003 filed 21 Jan. 2011, the entire contents and substance of each hereby incorporated by reference.

BACKGROUND OF THE INVENTION

1. Field of the Invention

Various embodiments of the invention relate to haptic systems and, more particularly, to systems, devices, and methods to transmit pressure waves, based on input electrical signals, through a sealed capsule filled with non-rigid matter, so as to produce haptic actuation of a surface.

2. Description of Related Art

Haptics is the science and technology of simulating felt sensations through a device for human contact. Haptics, used in conjunction with computational systems, promises to provide "for the sense of touch what computer graphics does for vision." (Robles-De-La-Torre, G. "Virtual Reality: Touch/Haptics." In Goldstein B (Ed.), *Encyclopedia of Perception*, Vol. 2, pp. 1036-1038, Sage Publications, Thousand Oaks, Calif. (2009)). Current technologies fall along a spectrum of achieving this promise.

The actuation mechanism most commonly in use in contemporary consumer haptics, such as those used in smart phones and vibrating videogame controllers, is the vibrating motor, or vibromotor. Vibromotors consist of a small rotary motor with an unbalanced mass. When supported and rotated within a rigid housing, vibromotors send vibration throughout the entire device. Vibromotors have certain disadvantages. They provide a low resolution, coarse, "buzzy" sensation often accompanied by a buzzing sound. They have limited configurability, meaning that the types of effects that they can produce are limited. They vibrate the entire housing of the device, and this vibration is non-localizable to a specific spot. Vibromotors do not translate well to soft surfaces, flexible surfaces, and textiles because of the need for a rigid housing to support the eccentric motor and carry the vibration.

Ceramic piezoelectric actuators will either vibrate or change shape when a voltage is applied. These piezoelectric elements have a slim profile and faster response time than vibromotors. They are more precisely controllable, thus producing higher resolution haptics and a larger library of effects. However, they operate at voltages in the one hundred to two hundred volts range and require more complex driver systems than vibromotors or other electromechanical components. Further, currently available materials for piezoelectric actuators are too brittle to be placed in soft or flexible surfaces. (Levin, M. and Woo, A. "Tactile-Feedback Solutions for an Enhanced User Experience," In *Information Display*, Volume 25, issue 10, pages 18-21.) Piezoelectric components may be coupled to the housing of a device to vibrate the housing, but the resulting vibration is not localized to a limited spot along the housing.

Dielectric electroactive polymers use the capacitance between two electrodes placed around an elastomer film, such that when a voltage is applied, the electrodes compress the film, thus elongating it. These also require high voltages, in the thirty megavolt/meter range, making them impractical for portable applications.

Other haptics technologies include mechanical force feedback devices and inertial force feedback devices, often in stylus or computer mouse form. These devices are often used in conjunction with graphics on a computer screen to simulate the haptic sensation of varying mechanical resistance when a cursor or other pointer on the screen encounters a graphically differentiated area. These technologies have not become portable beyond desktop-scale or laptop-scale computing systems.

Another class of haptic technologies uses differences in charge between an electrical field on a computer screen and a human appendage in contact with the screen to create felt sensations. For example, an invention called TeslaTouch, sponsored by Disney Research, can create a palpable charge difference between a human finger and the computer screen. This charge difference is configured to simulate various texture sensations by creating slight mechanical tugs on the skin. In this case, one part of the human body, such as a thumb or part of the palm, must be in contact with a conducting strip that provides a ground voltage, and the tactile sensations are felt when the finger is in motion.

None of the above mentioned technologies are appropriate for non-rigid applications, such as textiles, soft surfaces, or highly flexible surfaces. Furthermore, they all exhibit limitations in terms of an overall package of configurability, localization of felt haptic effect, resolution of felt haptic effect, and portability.

SUMMARY

There is a need in the art for improvements to conventional haptic systems. Exemplarily, such improvements may provide more localizable, high resolution haptic effects applicable to a wider range of applications. It is to such haptic systems, devices, and methods that various embodiments of the invention are directed.

Briefly described, various embodiments of the present invention are haptic systems, devices, and methods for producing haptic effects based on electrical signals. An exemplary haptic system can comprise a transducer and a transmission medium, in communication with a signal source and a contact surface.

The transducer can be an electronically activated actuator configured to convert electrical signals to mechanical motion, pressure waves, or a combination thereof. The transducer can receive an electrical signal from the signal source, such as an electronic file stored on an electronic memory storage device. Exemplarily, the transducer outputs mechanical motion, inaudible or barely audible infrasound or near infrasound waves, or a combination thereof, but other types of mechanical and pressure energy, or a combination thereof, may also be output.

The transmission medium can be a flexible medium configured to transmit pressure waves internally. The pressure waves can originate from the action of the transducer and can be transmitted through the transmission medium to the contact surface, thereby providing haptic effects to the contact surface. The transmission medium can be or comprise one or more sealed capsules filled with non-rigid matter. In some exemplary embodiments, the sealed capsule is filled at least partially with air at atmospheric pressure, but various other non-rigid materials can be used in other exemplary embodiments.

The contact surface can be available for human contact and can be in physical communication with the transmission medium. The outer shell of the sealed capsule can itself serve as the contact surface, or alternatively, a separate contact surface can be used in communication with the shell. Pressure waves or mechanical motion output by the transducer can provide haptic effects to the contact surface by producing pressure on and in the transmission medium.

Accordingly, the haptic system can achieve haptic effects by converting electrical signals via the transducer into mechanical motion or pressure waves to cause pressure on, or pressure waves within, the transmission medium to be transmitted to a human contact surface. The haptic system can utilize mechanical actuation or sound mechanical energy, including infrasound and near infrasound, to produce pressure or pressure waves, which can be channeled, concentrated, and localized through the flexible transmission medium. Thus the flexible transmission medium can afford the advantages of localizing the felt haptic effect to a specified location, as well as cushioning the transducer and other electronic devices so that the haptic system can be incorporated into textiles, soft surfaces, and flexible surfaces.

An exemplary device of the present invention can incorporate the haptic system into a textile or other soft object. In such a device, the textile can be used as the contact surface, such that haptic effects are delivered through an outer surface of the textile. When the haptic system is integrated into a blanket, the blanket can be used to soothe an infant or provide therapy to an individual through felt haptic effects.

These and other objects, features and advantages of the present invention will become more apparent in light of the following specification in conjunction with the accompanying drawing figures.

DETAILED DESCRIPTION

Figure 1:
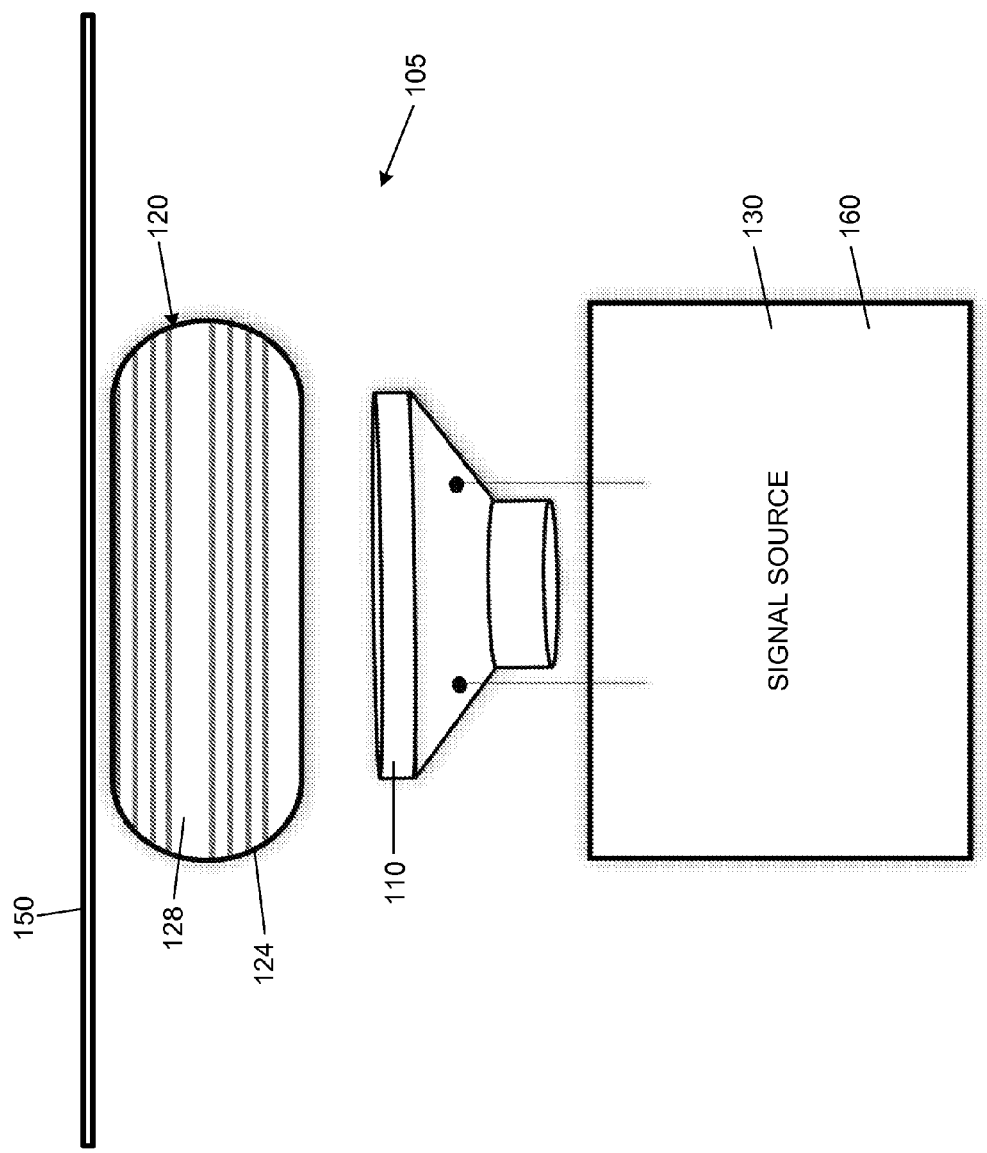
FIG. 1 illustrates a diagram of a haptic system, according to an exemplary embodiment of the present invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

FIG. 1 illustrates a haptic system 100, according to an exemplary embodiment of the present invention. As shown in FIG. 1, an exemplary haptic system 100 can comprise a core device 105, which itself can comprise a combination of a transducer 110 and a transmission medium 120. The core device 105 can be various sizes, such as, for example, the size of a small button or smaller. The transducer 110 and transmission medium 120 can be in communication with a signal source 130 and a contact surface 150.

Figure 2:
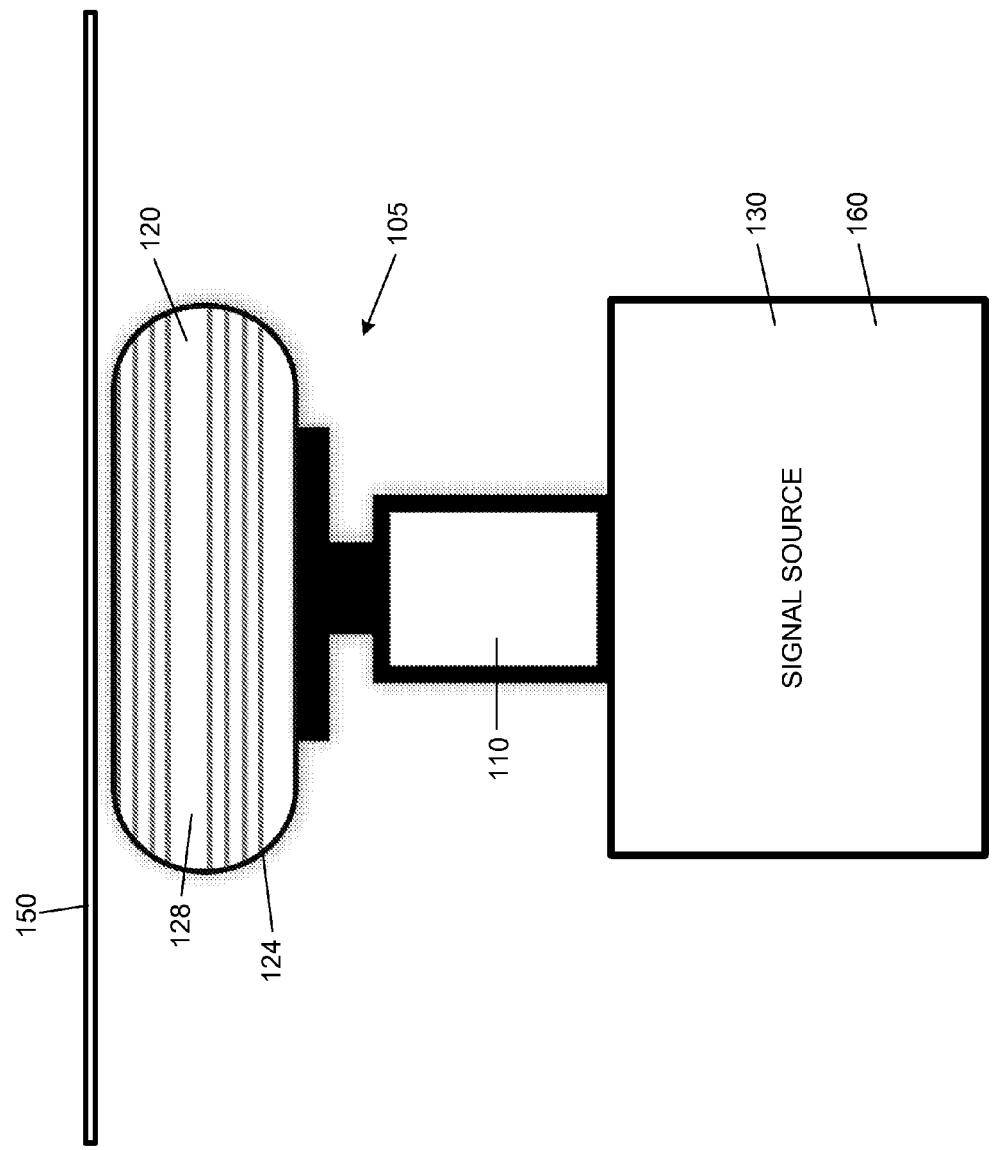
FIG. 2 illustrates a diagram of an alternative haptic system, according to an exemplary embodiment of the present invention.

The transducer 110 can receive one or more electrical signals from the signal source 130 and can translate the signals into one or more pressure waves within the transmission medium 120. The transducer 110 can be an audio transducer, loudspeaker, mechanical actuator, or other actuator, which can preferably be an electronically activated actuator. In some embodiments, as shown in FIG. 1, the transducer 110 is a small loudspeaker capable of producing inaudible infrasonic or barely audible near-infrasonic sound waves, thus enabling the haptic system 100 to provide felt pressure corresponding to the sound waves. In an exemplary embodiment, sound waves output by the transducer 110 are in the frequency range of approximately zero to fifty Hertz. Other types of transducers 110 can be used alternatively, or additionally, to a loudspeaker. As shown in FIG. 2, for example, the transducer 110 can be a mechanical actuator for producing pressure waves in the transmission medium 120.

The signal source 130 can provide an electrical signal to the transducer 110, thus enabling the haptic system 100 to provide haptic effects corresponding to the provided electrical signal. In an exemplary embodiment, the electrical signal can correspond to an electronic file, such as a prerecorded source or a sound, stored in a memory storage device that is part of the signal source. The transducer can convert the provided electrical signal to mechanical actuation or pressure waves.

The transmission medium 120 can be a sealed capsule, preferably polymeric, comprising a flexible shell 124 filled with non-rigid matter 128. For example, and not limitation, the non-rigid matter 128 of the capsule can be a gas, liquid, liquid crystals, gel, foam, or other fluid or related phase of matter or polymeric system, or particles, alone or in combination. In an exemplary embodiment, the non-rigid matter 128 is air at atmospheric pressure. The shell 124 can have a geometry and composition such that the entire transmission medium 120 is flexible, and the pressure of the transmission medium 120 can be such that pressure waves travel through it.

As shown in FIG. 1, in some embodiments, the transmission medium 120 can be in vibratory communication with a contact surface 150, such that the contact surface 150 can react to pressure waves transmitted through the transmission medium 120. The contact surface 150 can be a distinct surface positioned on or proximate the transmission medium 120, or alternatively, the contact surface 150 can comprise a portion of the shell 124 of the transmission medium 120. In some embodiments where the contact surface 150 is distinct from the transmission medium 120, the contact surface 150 can remain in contact with the transmission medium 120 at all times. In other embodiments, however, the contact surface 150 need not be in contact with the transmission medium 120 at all times, so long as pressure waves can be communicated from the transmission medium 120 to the contact surface 150. For example, and not limitation, the transmission medium 120 may touch the contact surface 150 only at times when haptic effects are actively being provided and the internal pressure waves push against the contact surface.

The contact surface 150 can be configured to receive mechanical pressure from the transmission medium 120. For example, and not limitation, the contact surface 150 can be a touchscreen of a mobile device, a textile, or other soft, flexible, or rigid surface. The contact surface 150 can thus provide haptic effects to a user who touches it. In some embodiments, a flexible touch sensor, such as a capacitive sensor, can be integrated into the contact surface 150 to provide a coordination of touch sensing and touch haptic effects for feedback and other purposes.

Figure 3:
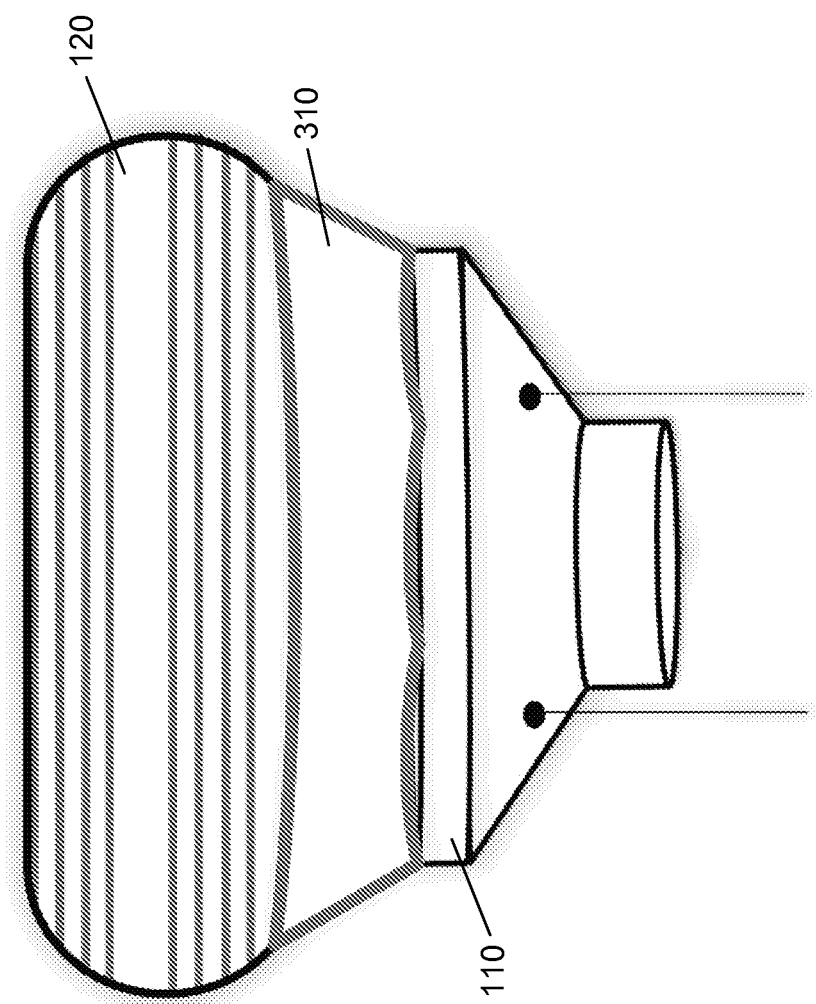
FIG. 3 illustrates an alternative core device of the haptic system, according to an exemplary embodiment of the present invention.

FIG. 3 illustrates an alternative core device 105 of the haptic system 100, according to an exemplary embodiment of the present invention. As shown, the core device 105 can additionally comprise a channel 310 between the transducer 110 and the transmission medium 120. Exemplarily, the channel 310 can be cylindrical or conical. The channel can be configured to reduce or eliminate dissipation of pressure waves. Accordingly, the channel 310 can enable the core device 105 to concentrate the pressure energy and provide a more precise location focus for haptic effects.

Referring back to FIG. 1, as shown, the haptic system 100 can further comprise, or be in communication with, a recorder 160. The recorder 160 can be integrated with the signal source 130, but this need not be the case.

If used, the recorder 160 can record sound as an electrical signal to be stored on a storage device, such that the transducer 110 converts the electrical signal from the recorder 160 into pressure waves transmitted through the transmission medium 120 to the contact surface 150. As a result, the haptic actuation of the contact surface 150 can correspond to the recorded data.

An exemplary embodiment of the haptic system 100 can comprise one or more of the core devices 105, which can be attached to one another in series, parallel, or a combination of both. The various core devices 105 used can be connected to the same or a variety of signal sources 130, thus receiving the same or a variety of electrical signals. When used alone, a single core device 105 can provide precise, focused haptic effects at a predetermined location of a device into which the haptic system 100 is integrated. When used in a group, the core devices 105 can be in communication with one another and can provide high resolution haptic effects across shared a contact surface 150.

Various applications and implementations exist for the embodiments of the present haptic system 100. Exemplary applications include, without limitation, a blanket or other textile configured to provide haptic effects, a touchscreen of an electronic device configured to provide haptic effects, and hand-held controllers with haptic effects for video games or equipment.

Figure 4:
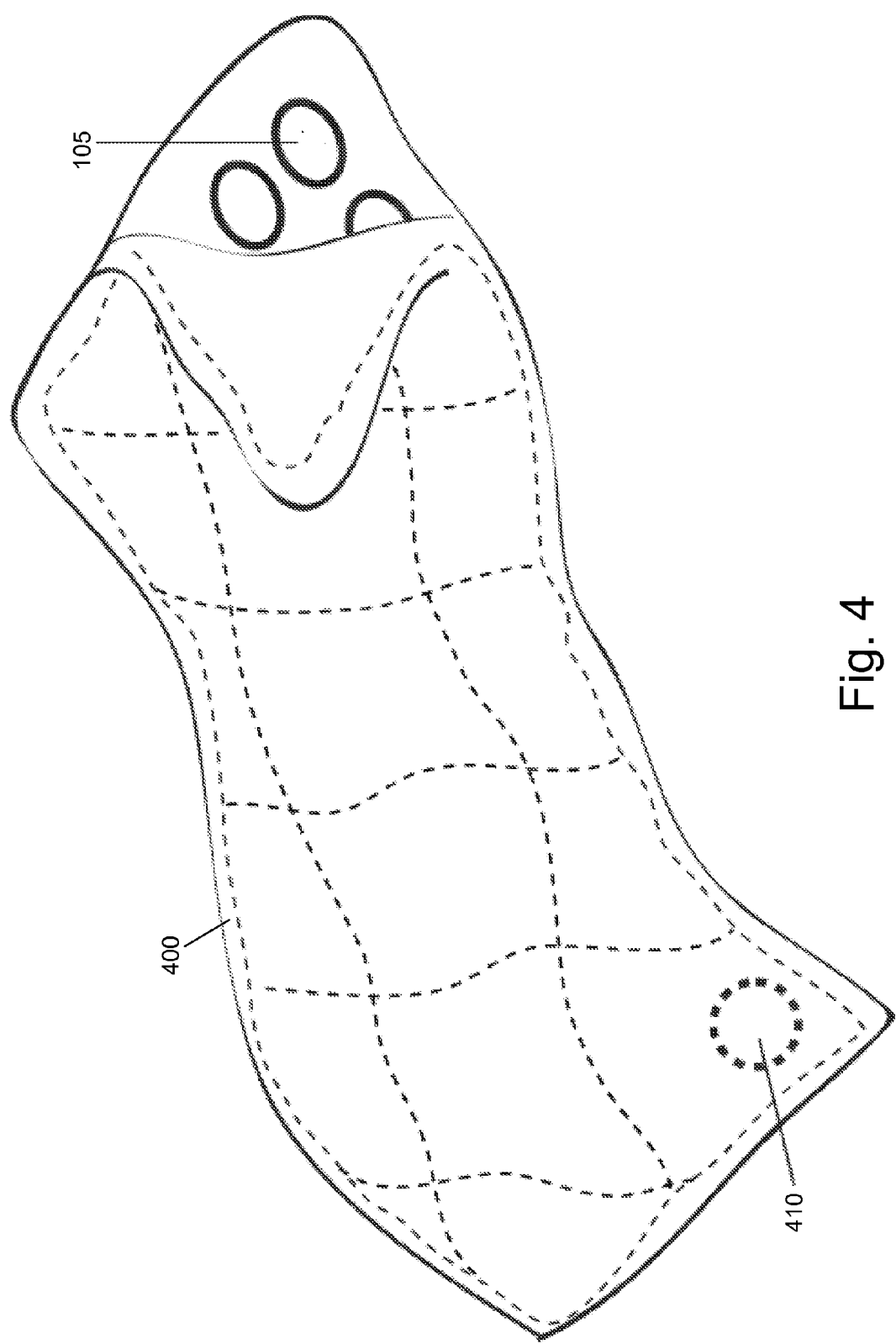
FIG. 4 illustrates a blanket utilizing the haptic system, according to an exemplary embodiment of the present invention.

FIG. 4 illustrates the haptic system 100 integrated into a blanket 400, according to an exemplary embodiment of the present invention. As shown in FIG. 4, the haptic system 100 can include a plurality of the core devices 105, each of which can include the transducer 110 and the transmission medium 120. Each core device 105 can be sewn into the blanket. For example, in the case of a quilted blanket, each patch of the quilt can comprise one or more core devices 105, which can be secured in the quilt by the sewn borders of the patches.

Figure 5:
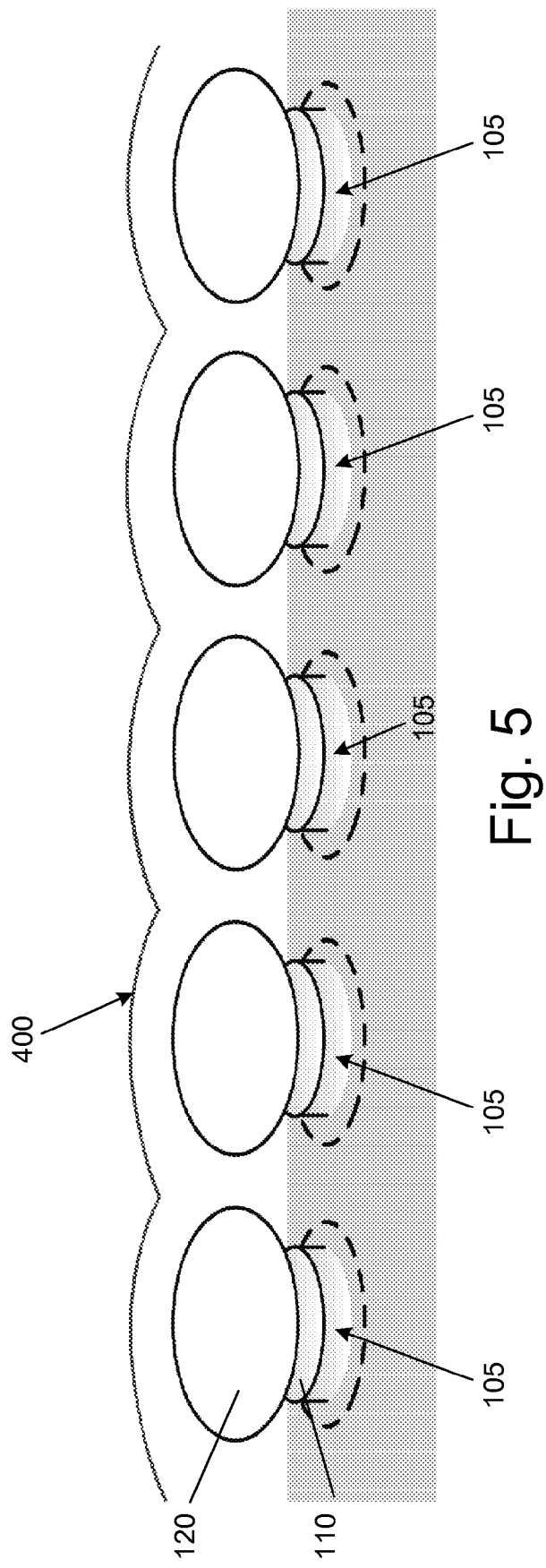
FIG. 5 illustrates a cross-section of the blanket utilizing the haptic system, according to an exemplary embodiment of the present invention.

An exemplary cross-section of such an embodiment is illustrated in FIG. 5. As shown in FIG. 5, the harder components of the core devices 105, e.g., the transducers 110, can be sunken into a filler layer of the patch. As discussed above, the transmission medium 120 can be a flexible component, and thus incorporation of the core device 105 need not affect the softness of the blanket into which it is integrated.

In addition to the core devices 105, other electronic components can be sewn into the seams of the blanket 400 according to known art in electronic textiles. Similarly, connections between components can be made using sewn conductive thread according to known art. In some embodiments, such electronic components can be detachable, i.e., secured on a detachable layer, and removed so the blanket can be washed, according to known art.

As shown in FIG. 4, the blanket 400 can comprise one or more ports 410 for attaching other devices, such as one or more of a recorder 160, stethoscope bell, mp3 player, mobile telephone, and other computing devices, to act as the signal source 130 or to communicate with or transfer electronic files to the signal source 130. Thus, electrical signals provided by a recorder 160 in the haptic system 100 in the blanket, or recorded by or output from an attached device, can be used to provide corresponding haptic effects in the blanket 300. These haptic effects can correspond to, for example, a recording or a user-generated or environmental source. In some embodiments, the blanket 400 can comprise a port 410 for a flash memory chip to act as an internal signal source 130.

An exemplary use of such an embodiment is to provide a therapeutic blanket 400, which can be used to soothe infants or a textile-based article to assist in therapies for individuals with post-traumatic stress disorder. Medical research suggests that rhythmic, low-level tactile stimulation can positively affect the arousal thresholds of sleeping infants and thus protect against Sudden Infant Death Syndrome. Haptics are already in use to help individuals with post-traumatic stress, though the devices used are typically hard, handheld devices.

The blanket 400 can be in electronic communication with a signal source 130 configured to provide an electrical signal from, for example, a recording or user-generated or environmental source. After the electrical signal is loaded, the blanket 400, textile, or other soft surface can produce haptic effects from the signal. An infant soothing blanket 400 of the present invention can be equipped so that a caregiver can hold the blanket to his or her chest to directly record the caregiver's heartbeat, or the caregiver can connect the blanket to a smartphone or other device with a software application that can record or provide a recorded heartbeat. The haptic system 100 can thus transform the heartbeat signal into mechanical pulses that can be felt throughout the surface of the blanket. The caregiver can wrap the infant in the blanket, soothing the infant with the heartbeat pulses.

Although providing haptic effects in a blanket is not new in the art, embodiments of the present invention improve on present technologies. For example, U.S. Pat. No. 4,969,867 ("Cohen") provides a haptic system implemented into a textile. However, the haptic system in Cohen lacks soft elements, thus causing the textile to be more rigid than desirable. In contrast, embodiments of the present invention can include a flexible transmission medium 120 to cushion harder components of the haptic system 100, thus potentially providing an overall softer blanket 400 without resorting to conventional textile fillers that would otherwise muffle or attenuate the haptic effect. In addition, Cohen provides no mechanism for concentrating sound energy. As a result, sound pressure is weakened due to dissipated energy.

Another exemplary embodiment of the haptic system 100 can be integrated into a touch-based electronic device, such as a mobile telephone or other mobile computing device with a touchscreen. In such an embodiment, one or more core devices 105 of the haptic system 100 can be provided inside the electronic device, using a touchscreen or other interactable surface as the contact surface 150. When haptic effects are desired, the electronic device can provide a signal source 130, through other internal components, as input to the core devices 105, thereby providing haptic effects to the touchscreen.

In the known art, haptic feedback in a mobile computing device is typically provided through use of a vibromotor, or rotary motor with an attached unbalanced mass. When feedback is desired, the mass is caused to move, thus vibrating the mobile computing device to provide the desired haptic feedback. A drawback of this approach is that the haptic feedback is imprecise and of low resolution, causing the entire interactable surface of the mobile computing device to vibrate.

In contrast, haptic effects provided by embodiments of the present haptic system 100 need not vibrate the entire mobile computing device and can be precise, high resolution, and varied. Each core device 105 can provide a variety of haptic effects to a limited area of the contact surface 150 of the mobile computing device. The effects provided can vary in modulation based on the electrical signals input to the transducers 110. If multiple core devices 105 are used, then haptic effects can also vary across the interactable surface, thus resulting in high resolution haptic effects.

Because of the flexibility of the transmission medium 120, a core device 105 of embodiments of the haptic system 100 can provide cushioning and overall flexibility not available in conventional systems. As a result, the haptic system 100 may be well-suited for use in a computing device utilizing a soft or flexible surface, such as a flexible organic LED video screen, or for use in the blanket 400 discussed above. In contrast to conventional haptic systems, some embodiments of the present invention may be particularly compatible with flexible touchscreens currently under development by Sony® and Samsung®, because the transmission medium 120 can provide for a soft and flexible contact surface 150.

Yet another exemplary embodiment of the invention can be integrated into a handheld controller, such as for equipment operation or video gaming. For example, a controller can comprise one or more core devices 105, each in communication with a location held by a user. In some such embodiments, each core device 105 can provide haptic effects independently of the other core devices 105, so as to vary the effects to indicate various events to the user. In the case of equipment control, such precise, focused, haptic effects can provide specific information to the user, potentially including information that is simultaneously displayed on a control panel or monitor screen. This can be important in situations where an operator's visual attention is unsafely divided between a task and a control panel or monitor screen. These embodiments provide improvement over the known art, as such haptic effects can be controlled and focused in a manner that is not enabled by current handheld controllers.

Embodiments of the haptic system 100 can overcome disadvantages of conventional haptic technologies by providing high resolution, highly configurable, localizable, soft and flexible haptics. Many transducers, such as loudspeakers and mechanical actuators, are capable of mechanical action corresponding with precision to an electronic signal. In turn, electronic signals are highly configurable and high-resolution, capable of an infinite amount of variation.

Embodiments of the haptic system 100 can leverage this precision, resolution, and configurability by using such transducers to translate electrical signals into pressure within the transmission medium 120, so that the pressure is preserved, concentrated, and localized and thus can create high-resolution, highly-varying haptic effects through a contact surface 150. Furthermore, the transmission medium 120 can localize the haptic effect to a limited area, instead of dissipating the energy throughout a device, housing, or surface. Thus, specific effects can be felt in specific places. Further still, multiple core devices 105 can be combined across a surface to provide multiple effects over that area. Even further, an exemplary transmission medium is soft and flexible, allowing for the core devices 105 to be embedded in a wider variety of objects, such as textiles, soft surfaces, and flexible screens, without affecting the soft and flexible qualities expected of such objects and devices, and without attenuating the haptic signal as conventional textile-based fillers would. In contrast, current haptic technologies such as vibromotors and other haptic actuators have limited resolution, dissipate energy throughout the device, and require a rigid housing.

Accordingly, as discussed above, various embodiments of the haptic system 100 can include various improvements over conventional haptic systems. While the invention has been disclosed in its exemplary forms, it will be apparent to those skilled in the art that many modifications, additions, and deletions can be made without departing from the spirit and scope of the invention and its equivalents, as set forth in the following claims.

What is claimed is:

1. A haptic system comprising:
   an encapsulated transmission medium;
   a transducer; and
   an electronic circuit that delivers a stored electronic haptic signal to the transducer;
   wherein the transducer converts the electronic haptic signal to at least one of mechanical actuation and pressure waves, resulting in pressure waves that are internal to and travel through the encapsulated transmission medium that concentrates and localizes the pressure waves to a surface.

2. The haptic system of claim 1 further comprising a channel between the transducer and the encapsulated transmission medium, the channel configured to focus the pressure waves output by the transducer.

3. The haptic system of claim 1 further comprising a contact surface in communication with the encapsulated transmission medium and receiving mechanical haptic effects generated by the transducer.

4. The haptic system of claim 1, the encapsulated transmission medium comprising a flexible sealed capsule at least partially filled with non-rigid matter selected from the group consisting of fluid, liquid crystals, gel, foam, polymeric material, and particles.

5. The haptic system of claim 1, the surface is a surface of the encapsulated transmission medium adapted for human contact.

6. The haptic system of claim 3, the contact surface selected from the group consisting of a textile, an interactable touchscreen and a handheld controller.

7. The haptic system of claim 1 further comprising a human contact textile, wherein the encapsulated transmission medium, transducer and electronic circuit are incorporated into the textile, the haptic system adapted to generate mechanical haptic effects related to a soothing characteristic.

8. The haptic system of claim 7, the soothing characteristic comprising a heartbeat.

9. The haptic system of claim 7, the soothing characteristic formed from low frequency, rhythmic, haptic sensations.

10. The haptic system of claim 9, the haptic system used to mitigate a condition selected from the group consisting of sudden infant death, infant sleep apnea, and post traumatic stress disorder therapy.

11. A haptic system comprising:
   a plurality of core haptic devices, each core haptic device comprising:
      an encapsulated transmission; and
      a transducer for converting an electronic haptic signal to at least one of mechanical actuation and pressure waves, resulting in internal pressure waves that are internal to and travel through the encapsulated transmission medium; and
   a contact surface in physical communication with at least a portion of the plurality of core haptic devices,
   wherein the encapsulated transmission medium of at least a portion of the plurality of core haptic devices receives mechanical haptic effects generated by the transducer and transmitted as pressure through the encapsulated transmission medium.

12. The haptic system of claim 11 further comprising a channel between at least one of the transducers of the plurality of core haptic devices and the associated encapsulated transmission medium, the channel configured to focus the pressure waves output by the transducer.

13. The haptic system of claim 11, wherein the encapsulated transmission media of at least a portion of the plurality of core haptic devices comprises a flexible sealed capsule at least partially filled with non-rigid matter selected from the group consisting of fluid, liquid crystals, gel, foam, polymeric material, and particles.

14. The haptic system of claim 11, the contact surface comprising a surface of the encapsulated transmission medium.

15. The haptic system of claim 11, the contact surface comprising discrete surface in vibratory communication with the encapsulated transmission medium.

16. The haptic system of claim 15, the contact surface selected from the group consisting, of a textile, an interactable touchscreen and a handheld controller.

17. The haptic system of claim 11, the contact surface comprising an interactable surface of a mobile computing device, wherein the mobile computing device is configured to provide localized haptic effects corresponding to at least a portion of the plurality of core haptic devices.

18. A device comprising:
   a textile; and
   a plurality of haptic devices, each haptic device comprising:
      an encapsulated transmission medium;
      a transducer; and
      an electronic circuit that delivers a stored electronic haptic signal to the transducer;
   wherein the transducer converts the electronic haptic signal to at least one of mechanical actuation and pressure waves, resulting in pressure waves that are internal to and travel through the encapsulated transmission medium that concentrates and localizes the pressure waves to the textile.

19. The device of claim 18 further comprising a channel between at least one of the transducers of the plurality of haptic devices and the associated encapsulated transmission medium, the channel configured to focus the pressure waves output by the transducer.

20. The device of claim 18, wherein the encapsulated transmission media of at least a portion of the plurality of core haptic devices comprises a flexible sealed capsule at least partially filled with non-rigid matter selected from the group consisting of fluid, liquid crystals, gel, foam, polymeric material, and particles.

* * * * *